United States Patent [19]

Riess et al.

[11] 3,925,491

[45] Dec. 9, 1975

[54] NEW FLUORINATED DIENES AND PROCESS FOR PREPARING SAME

[75] Inventors: Jean G. Riess; Maurice Le Blanc; Georges Santini; Jacky Guion, all of Nice, France

[73] Assignee: Produits Chimiques Ugine Kuhlmann, Saint-Denis, France

[22] Filed: Jan. 31, 1975

[21] Appl. No.: 545,894

Related U.S. Application Data

[62] Division of Ser. No. 446,101, Feb. 26, 1974, Pat. No. 3,901,948.

[30] Foreign Application Priority Data

Feb. 28, 1973 France .............................. 73.07107

[52] U.S. Cl. ......................... 260/653.3; 260/653.5
[51] Int. Cl.² .................................... C07C 17/28
[58] Field of Search .... 260/653.3, 653.1 T, 653.1 R

[56] References Cited
UNITED STATES PATENTS

| | | | |
|---|---|---|---|
| 2,996,527 | 8/1961 | Krespan ............................ | 260/653.3 |
| 3,062,901 | 11/1962 | Newport et al. .................. | 260/653.3 |
| 3,067,264 | 12/1962 | Paciorek ........................... | 260/653.3 |
| 3,317,618 | 5/1967 | Haszeldine ....................... | 260/653.3 |

*Primary Examiner*—D. Horwitz
*Attorney, Agent, or Firm*—Pennie & Edmonds

[57] ABSTRACT

Fluorinated dienes are disclosed which have the formula $$R_F - CF = CH - CH = CF - R_F' \qquad 1$$

wherein $R_F$ and $R_F'$ may be the same or vary and represent a straight or branched saturated fluoro-carbon radical $C_nF_{2n+1}$, and $n$ is a whole number between 1 and 20. The radical may also contain a few atoms of hydrogen and halogens other than fluorine. A method for the preparation of these fluorinated dienes is also disclosed.

2 Claims, No Drawings

NEW FLUORINATED DIENES AND PROCESS FOR PREPARING SAME

This is a division, of application Ser. No. 446,101 filed Feb. 26, 1974 now U.S. Pat. No. 3,901,948.

DESCRIPTION OF THE INVENTION

I. Field of the Invention

This invention relates to fluorinated dienes and a method for their preparation.

II. Description of the Prior Art

The compound tetrafluorobutadiene
$$F_2C = CH - CH = CF_2 \qquad \text{II}$$
is known in the art but this compound does not fall within the framework of the present invention because $R_F$ and $R_F'$ substantially differ from F.

K. L. Paciorak, B. A. Merkl and C. T. Lenk, in volume 27 of the JOURNAL OF ORGANIC CHEMISTRY, page 1015 (1962) describe the following compound:

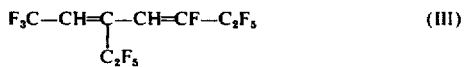

Although the article describes a compound (III) which approaches the compound (I) of the claimed invention, it neither suggests nor discloses the compounds (I).

The present invention involves the discovery that by reacting the two compounds $R_F'CF_2I$ and $R_FCF_2 - CH = CH_2$ with copper in the presence of a solvent according to the reaction:
$$R_F'CF_2I + R_FCF_2 - CH = CH_2 + 2C_u \text{ Solvent} \qquad A$$
one obtains a mixture of compounds (IV and I)
$$R_F - CF = CH - CH_2CF_2R_F' \quad (IV) \text{ and}$$
$$R_F - CF = CH - CH = CF - R_F' \quad (I).$$

The initial reagents $R_F'CF_2I$ and $R_FCF_2 - CH = CH_2$ are known (Hazeldine, J.CHEM.SOC., 1949, page 2856).

These compounds are extremely difficult to separate. The applicants have, however, discovered that by varying the conditions of the reaction, it is possible to produce the compound (I) alone. This is an unexpected and surprising result.

The applicants have found that at relatively mild experimental conditions, for example 15 hours at 120°C, a mixture of approximately 20 percent of the compound of the formula (IV) and 80 percent of the compound of the formula (I) resulted which was difficult to separate. However, when more severe conditions, i.e., prolonged heating or higher temperature were applied, it was unexpectedly found that the compound of formula (I) was obtained exclusively.

SUMMARY OF THE INVENTION

The present invention involves compounds of fluorinated dienes having the formula
$$R_F - CF = CH - CH = CF - R_F' \qquad I$$
in which $R_F$ and $R_F'$ are the same or different and each represents a fluorocarbon radical containing 1 to 20 carbon atoms ($C_nF_{2n+1}$ where $n$ equals 1 to 20). The compounds which are the subject of the present invention are also capable of containing a few atoms of hydrogen or halogens other than fluorine.

The method of preparation of the compounds of formula (I) can be represented by the equation:

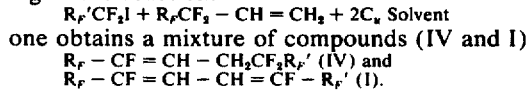

This reaction may be carried out at a temperature from about 120°C to about 150°C for a period between about 10 hours to about 72 hours. The reaction time may vary and is approximately inversely proportional to the temperature. Some examples of solvents that can be used include dimethyl formamide (DMF), dimethyl sulphoxide (DMSO), an aromatic or heterocyclic amine such as pyridine, a heavy ether of the ethylene polyoxide type, a glycol dimethyl ether (glyme), or any other suitable solvent.

DESCRIPTION OF THE PREFERRED EMBODIMENTS

The above reaction (B) contains an excess of approximately 5 to 100 percent of the compound $R_F'CF_2I$ above the stoichiometric quantity required and about 2 to 5 gram atoms of copper per mole of $R_F'CF_2I$. The copper which can be used in the above reaction may be, for example, copper produced by displacement reaction $CuSO_4 + Zn \downarrow \rightarrow Cu \downarrow + ZnSO_4$ or copper produced via the reduction of CuO.

The reaction time and the temperature vary in inverse proportion. For example, for a temperature of 120°C a reaction time of about 72 hours is necessary, while at 150°C the formation of the compound (I) in a preponderant quantity is observed after only about 10 hours.

Tetrafluorobutadiene may be prepared in accordance with the above reaction (B) by reacting the compound of the formula $H-CF_2-CH=CH_2$ and the compound $CF_3I$ in a molar excess of approximately 5 to 100 percent, in the presence of approximately 2 to 5 gram atoms of copper per mole of the compound $CF_3I$, in a solvent at a temperature of between about 120°C and about 150°C for a time to produce exclusively or substantially exclusively tetrafluorobutadiene. Examples of solvents that may be used are mentioned above.

The new compounds of the present invention can be used as monomers for homopolymerization or copolymerization with fluorine dienes or with ethylenically unsaturated hydrocarbons, such as propylene by standard diene polymerization or copolymerization techniques in which latter instance they may be used to form polymers (films, for example) with stain resistant properties.

In addition, the fluorinated diolefins of the invention have excellent physical properties for use as oxygen transport in biological systems (i.e., synthetic blood and other uses). By way of illustration
$$C_5H_{11} - CF = CH - CH = CF - C_3H_7$$
has a density of 1.689 and at 37°C under 760 mm Hg the above fluorinated diolefin can dissolve 41.5 ml of oxygen per 100 ml and 222 ml of $CO_2$ per 100 ml of the olefin.

Fluorocarbons have been recognized as having utility as blood substitute in animals. See, for example, the publication CHEMISTRY, Vol. 46(8), Sept. 1973, pp. 20 and 21.

The following examples illustrate the invention in a nonrestrictive manner.

EXAMPLE 1

A mixture of $C_5F_{11} - CF_2 - I$ (0.062 moles) and $C_3F_7 - CF_2 - CH = CH_2$ (0.05 moles) was heated with 10 g of powdered copper produced via the displacement reaction of $CuSO_4$ with Zn, and 50 mls of anhydrous DMF at 140°C for about 72 hours. After extraction with ether and centrifuging so as to eliminate the copper salts formed, the reaction product was washed with water so as to eliminate the DMF. The ether phase was then dried over magnesium sulphate and then evaporated. The residue was distilled under reduced pressure. The compound $C_3F_7-CF=CH-CH=CF-C_5F_{11}$ was obtained in a yield of 80%.

| Analysis | C | H | F |
|---|---|---|---|
| %, calculated for $C_{12}H_2F_{20}$ | 27.38 | 0.38 | 72.24 |
| % found in reaction product | 27.61 | 0.45 | 71.88 |

The compound obtained is liquid and distils at 38°C under 0.5 mm Hg. The compound was identified by its nuclear magnetic resonance spectrum (NMR).

EXAMPLE 2

The procedure in Example 1 was followed except that the 0.05 moles of $C_3F_7-CF_2-CH=CH_2$ was changed to 0.062 moles of $C_7F_{15}CF_2I$. This resulted in the formation of the compound $C_3F_7-CF=CH-CH=CF-C_7F_{15}$ in a yield of 75 percent.

| Analysis | C | H | F |
|---|---|---|---|
| %, calculated for $C_{14}H_2F_{24}$ | 26.84 | 0.32 | 72.84 |
| % found in the reaction product | 27.04 | 0.35 | 72.51 |

The compound obtained is a liquid which distils at 54°C under 0.4 mm Hg. The compound was identified by its NMR spectrum.

EXAMPLE 3

The mixture of Example 1 was heated to 150°C in DMF. The percent conversion into the desired compound $C_3F_7-CF=CH-CH=CF-C_5F_{11}$ equal to 75 percent after about 18 hours. In DMSO the percent of conversion is equal to 70 percent after about 18 hours.

EXAMPLES 4 to 7

By repeating the conditions of Example 1, the following compounds were prepared:

| Ex. | Compounds | Boiling Point/mm Hg | Melting Point °C |
|---|---|---|---|
| 4 | $C_3F_7-CF=CH-CH=CF-C_3F_7$ | 47°C/2 mm | |
| 5 | $C_5F_{11}-CF=CH-CH=CF-C_5F_{11}$ | 62°C/0.45 mm | |
| 6 | $C_7F_{15}-CF=CH-CH=CF-C_5F_{11}$ | 83°C/0.45 mm | 38–39 |
| 7 | $C_7F_{15}-CF=CH-CH=CF-C_7F_{15}$ | | 64 |

These compounds are identifiable by their distillation temperatures under reduced pressure and/or their melting point as indicated above, as well as by their NMR spectra.

We claim:

1. A process for the preparation of tetrafluorobutadiene, which comprises reacting the compound of the formula $H-CF_2-CH=CH_2$ and the compound $CF_3I$ in a molar excess of approximately 5 to 100 percent, in the presence of approximately 2 to 5 gram atoms of copper per mole of the compound $CF_3I$, in a solvent at a temperature of between about 120°C and about 150°C for a time to produce exclusively or substantially exclusively tetrafluorobutadiene.

2. A process according to claim 1 wherein the solvent is selected from the group consisting essentially of dimethylformamide, dimethyl sulphoxide, heavy ethers, glycol dimethyl ether (glyme), aromatic amines and heterocyclic amines.

* * * * *

UNITED STATES PATENT AND TRADEMARK OFFICE
CERTIFICATE OF CORRECTION

PATENT NO. : 3,925,491
DATED : December 9, 1975
INVENTOR(S) : Jean G. Riess et al.

It is certified that error appears in the above-identified patent and that said Letters Patent are hereby corrected as shown below:

Column 1, line 61, "a→fluorocarbon" should read --a fluorocarbon--

Column 2, line 15, "approximately→5" should read --approximately 5--.

Signed and Sealed this thirteenth Day of April 1976

[SEAL]

Attest:

RUTH C. MASON
Attesting Officer

C. MARSHALL DANN
Commissioner of Patents and Trademarks